(12) United States Patent
Lee et al.

(10) Patent No.: US 9,356,312 B2
(45) Date of Patent: May 31, 2016

(54) METHOD FOR PREPARING SECONDARY BATTERY AND THE SECONDARY BATTERY PREPARED BY USING THE SAME

(71) Applicant: LG Chem, Ltd., Seoul (KR)

(72) Inventors: YounKyoung Lee, Seoul (KR); Jihyun Kim, Daejeon (KR); SeongMin Lee, Seoul (KR)

(73) Assignee: LG Chem, Ltd. (KR)

( * ) Notice: Subject to any disclaimer, the term of this patent is extended or adjusted under 35 U.S.C. 154(b) by 505 days.

(21) Appl. No.: 13/864,564

(22) Filed: Apr. 17, 2013

(65) Prior Publication Data

US 2013/0316224 A1 Nov. 28, 2013

(30) Foreign Application Priority Data

Apr. 17, 2012 (KR) .......................... 10-2012-0039765

(51) Int. Cl.
- *H01M 10/04* (2006.01)
- *H01M 4/36* (2006.01)
- *H01M 4/48* (2010.01)
- *H01M 4/131* (2010.01)

(52) U.S. Cl.
CPC ............ *H01M 10/049* (2013.01); *H01M 4/131* (2013.01); *H01M 2220/20* (2013.01); *Y02E 60/122* (2013.01); *Y02P 70/54* (2015.11); *Y10T 29/4911* (2015.01)

(58) Field of Classification Search
CPC ... H01M 10/049; H01M 10/04; H01M 4/131; H01M 2/02; H01M 2/10
See application file for complete search history.

(56) References Cited

U.S. PATENT DOCUMENTS

| | | | | |
|---|---|---|---|---|
| 6,444,369 | B1* | 9/2002 | Kamino et al. | 429/303 |
| 2010/0024204 | A1* | 2/2010 | Min et al. | 29/623.2 |
| 2011/0008665 | A1* | 1/2011 | Yoon et al. | 429/120 |
| 2011/0244321 | A1* | 10/2011 | Kim et al. | 429/207 |
| 2011/0293975 | A1* | 12/2011 | Iyori | H01M 2/027 429/90 |

FOREIGN PATENT DOCUMENTS

| | | |
|---|---|---|
| KR | 20070082379 A | 8/2007 |
| KR | 2009-0129500 A | 12/2009 |

OTHER PUBLICATIONS

Machine Translation of: KR 1020070082379, Kim et al., Aug. 21, 2007.*

* cited by examiner

*Primary Examiner* — Kenneth Douyette
(74) *Attorney, Agent, or Firm* — Lerner, David, Littenberg, Krumholz & Mentlik, LLP

(57) ABSTRACT

Disclosed is a method for producing a secondary battery in which an electrode assembly comprising a cathode, an anode and a separator interposed between the cathode and the anode is accommodated in a battery case, the method comprising inserting the electrode assembly into the battery case, injecting an electrolyte into the battery case accommodating the electrode assembly to obtain a secondary battery, storing the secondary battery at a SOC of 1 to 20 for 3 hours to 10 days, removing gas present in the secondary battery, and sealing the battery case, wherein the anode comprises lithium titanium oxide (LTO) represented by the following Formula 1 as an anode active material:

$$Li_aTi_bO_{4-c}A_c \quad (1)$$

wherein a, b and c are determined according to an oxidation number of M' within ranges of $0.5 \leq a \leq 3$, $1 \leq b \leq 2.5$, and $0 \leq c < 0.2$; and
A is at least one monovalent or bivalent anion.
Disclosed is also a secondary battery produced by the method.

15 Claims, 2 Drawing Sheets

METHOD FOR PREPARING SECONDARY BATTERY AND THE SECONDARY BATTERY PREPARED BY USING THE SAME

CROSS-REFERENCE TO RELATED APPLICATIONS

The present application claims priority from Korean Application No. 10-2012-0039765 filed Apr. 17, 2012, the disclosure of which is hereby incorporated herein by reference.

TECHNICAL FIELD

The present invention relates to a method for producing a secondary battery in which an electrode assembly comprising a cathode, an anode and a separator interposed between the cathode and the anode is accommodated in a battery case, the method comprising inserting the electrode assembly into the battery case, injecting an electrolyte into the battery case accommodating the electrode assembly to obtain a secondary battery, storing the secondary battery at a SOC of 1 to 20 for 3 hours to 10 days, removing gas present in the secondary battery, and sealing the battery case, wherein the anode comprises lithium titanium oxide (LTO) represented by a specific formula as an anode active material.

BACKGROUND ART

Technological development and increased demand for mobile equipment have led to a sharp increase in the demand for secondary batteries as energy sources. Among these secondary batteries, lithium secondary batteries having high energy density and driving voltage, long lifespan and low self-discharge are commercially available and widely used.

In addition, in recent years, increased interest in environmental issues has brought about a great deal of research associated with electric vehicles (EVs) and hybrid electric vehicles (HEVs) as substitutes for vehicles, such as gasoline vehicles and diesel vehicles, using fossil fuels which are major causes of air pollution. Nickel metal hydride (Ni-MH) secondary batteries are generally used as power sources of electric vehicles (EVs), hybrid electric vehicles (HEVs) and the like. However, research associated with use of lithium secondary batteries having high energy density, high discharge voltage and power stability is actively underway and some of such lithium secondary batteries are commercially available.

A lithium secondary battery has a structure in which a non-aqueous electrolyte comprising a lithium salt is impregnated into an electrode assembly comprising a cathode and an anode, each comprising an active material coated on a current collector, and a porous separator interposed therebetween.

Recently, a carbon-based material is generally used as an anode for lithium secondary batteries. However, the carbon-based material has a potential of 0V which is lower than lithium, thus disadvantageously inducing reduction of an electrolyte and causing generation of gas. In order to solve these problems, lithium titanium oxide (LTO) having a relatively high potential is also used as an anode active material.

However, LTO may cause generation of a great amount of hydrogen gas during activation and charge/discharge, leading to deterioration in safety of secondary batteries.

Accordingly, there is an increasing need for methods capable of ultimately solving these problems.

DISCLOSURE

Technical Problem

Therefore, the present invention has been made to solve the above and other technical problems that have yet to be resolved.

As a result of a variety of extensive and intensive studies and experiments, the present inventors discovered that an amount of hydrogen gas generated during charge/discharge is decreased and, advantageously, safety of secondary batteries can be secured and electrochemical performance thereof can be improved, when the secondary batteries are stored at a SOC of 1 to 20 in an activation process, as described later. The present invention has been completed, based on this discovery.

Technical Solution

In accordance with one aspect of the present invention, provided is a method for producing a secondary battery in which an electrode assembly comprising a cathode, an anode and a separator interposed between the cathode and the anode is accommodated in a battery case, the method comprising:

inserting the electrode assembly into the battery case;

injecting an electrolyte into the battery case accommodating the electrode assembly;

storing the secondary battery at a SOC of 1 to 20 for 3 hours to 10 days;

removing gas present in the secondary battery; and sealing the battery case, wherein the anode comprises lithium titanium oxide (LTO) represented by the following Formula 1 as an anode active material:

$$Li_a Ti_b O_{4-c} A_c \qquad (1)$$

wherein a, b and c are determined according to an oxidation number of M' within ranges of $0.5 \leq a \leq 3$, $1 \leq b \leq 2.5$, and $0 \leq c < 0.2$; and A is at least one monovalent or bivalent anion.

In a specific embodiment, the lithium titanium oxide (LTO) may be  $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$ or the like. There is no limitation as to the composition and type of the lithium metal oxide so long as it is capable of intercalating and deintercalating lithium ions. More specifically, the lithium metal oxide may be $Li_{1.33}Ti_{1.67}O_4$ or $LiTi_2O_4$ having a spinel structure which undergoes a minimal change in crystal structural during charge and discharge, and is highly reversible.

Generally, the secondary battery is activated through the first charge/discharge after primary assembly. The gas generated during this process is removed and the battery is sealed to complete production of the battery.

When lithium titanium oxide which readily adsorbs moisture is used as an anode active material, activation is essential. This is the reason that moisture adsorbed by lithium titanium oxide may cause generation of a great amount of hydrogen gas.

A charge profile of the lithium titanium oxide is shown in FIG. 1. Referring to FIG. 1, the lithium titanium oxide maintains a potential of about 1.5V at a charge of state (SOC) of 0 to 100. 1.5V is a potential enabling moisture to be reduced. Accordingly, during activation, moisture present in the secondary battery is preferably completely reduced while the secondary battery is stored.

As SOC increases, a potential of the corresponding cathode active material also increases. At a high potential, the lithium titanium oxide may cause negative reactions with the electrolyte and the generated hydrogen may be oxidized again. The moisture present in the secondary battery is preferably reduced again by storing the battery at a low SOC, for example, of 1 to 20.

The storage is preferably carried out at a temperature higher than room temperature in order to facilitate gas generation. Safety of the secondary battery may be deteriorated at an excessively high temperature. Accordingly, the storage temperature is preferably 40° C. to 70° C.

The present invention provides a secondary battery produced by the method.

There is no limit as to the type or shape of the battery case of the secondary battery. General shapes of the secondary battery include rectangular, cylindrical or pouch shapes.

The pouch-type battery case may be composed of a laminate sheet comprising a resin layer and a metal layer. Advantageously, the laminate sheet can reduce a weight of a secondary battery, as compared to a metal-made case.

In a preferred embodiment, the laminate sheet may have a laminate structure including an outer resin layer, an air and moisture-blocking metal layer, i.e., a barrier layer, and a heat-fusing inner resin layer.

The outer resin layer should have resistance to outdoor environments, thus requiring predetermined levels of tensile strength and waterproofness. In this regard, a polymer resin for an outer coating layer may comprise polyethylene naphthenate (PEN), polyethylene terephthalate (PET) or drawn nylon which exhibits superior tensile strength and waterproofness.

In addition, the outer coating layer may be composed of polyethylene naphthenate (PEN) and/or may have a structure including a polyethylene terephthalate (PET) layer provided on an outer surface of the outer coating layer.

The polyethylene naphthenate (PEN) is suitable for use as the outer coating layer since it has superior tensile strength and waterproofness in spite of low thickness, as compared to polyethylene terephthalate (PET).

As the polymer resin for the inner resin layer, a polymer resin which has a heat-fusing property (heat-adhesiveness) and low absorbance to an electrolyte so as to prevent permeation of the electrolyte and is neither swollen nor corroded by the electrolyte is preferably used. More preferably, the polymer resin is composed of a non-drawn polypropylene film (CPP).

In a preferred embodiment, the laminate sheet according to the present invention has a structure in which the outer coating layer has a thickness of 5 to 40 μm, the barrier layer has a thickness of 20 to 150 μm, and the inner sealant layer has a thickness of 10 to 50 μm. When thicknesses of respective layers of the laminate sheet are excessively small, improvement in the capability of blocking materials and strength is not obtained and when the thicknesses are excessively large, disadvantageously, processability is deteriorated and sheet thickness is increased.

The structure of the electrode assembly contained in the secondary battery is not particularly limited and examples thereof include a winding structure, a stack structure and a stack-folding structure.

The electrode assembly may have a structure of cathode/separator/anode constituting a secondary battery and is generally classified into a jellyroll type (winding type) and a stack-type (laminate type) depending on the structure thereof. The jellyroll type electrode assembly is produced by coating a metal foil used as the current collector with an electrode active material, followed by drying and pressing, cutting the metal foil in the form of a band with desired width and length, inserting a separator between an anode and a cathode, and winding the resulting structure in a spiral form. The jellyroll type electrode assembly is suitable for a cylindrical battery, but is unsuitable for rectangular or pouch batteries due to problems such as detachment of the electrode active material and poor space utilization. On the other hand, the stack-type electrode assembly has a laminate structure in which a plurality of cathode and anode units are stacked in this order, and is advantageously easy to obtain a rectangular shape, but disadvantageously entails a complicated production process and causes short-circuit since the electrode is pushed when shock is applied thereto.

In order to solve these problems, as an electrode assembly with an improved structure which is a combination of jellyroll and stack types, an electrode assembly having a structure in which a full cell having a cathode/separator/anode structure with a predetermined unit size, or a bi-cell having a cathode (anode)/separator/anode(cathode)/separator/cathode(anode) structure is folded using a long consecutive separator film is developed and this electrode assembly with the structure is referred to as a stack/folding type electrode assembly.

The full cell is a cell having a cathode/separator/anode unit structure, in which the cathode and the anode are arranged at both sides of the cell. Examples of the full cell include a cathode/separator/anode cell having the most basic structure, a cathode/separator/anode/separator/cathode/separator/anode cell or the like.

In addition, the bi-cell is a cell in which identical electrodes are arranged at both sides of the cell, such as cathode/separator/anode/separator/cathode unit structure or anode/separator/cathode/separator/anode unit structure. Generally, the cell having a cathode/separator/anode/separator/cathode structure is referred to as a "C-type bi-cell", and a cell having an anode/separator/cathode/separator/anode structure is referred to as an "A-type bi-cell". That is, a cell in which a cathode is arranged at both sides thereof is referred to as a "C-type bi-cell" and a cell in which an anode is arranged at both sides thereof is referred to as an "A-type bi-cell".

The numbers of the cathode, anode and separator constituting these bi-cells are not particularly limited so long as the electrodes arranged at both sides of the cells are identical.

The full cell and the bi-cell are produced by bonding the cathode to the anode such that the separator is interposed between the cathode and the anode. A preferred example of this bonding includes heat-fusion.

The cathode of the present invention may be, for example, fabricated by applying a mixture containing a cathode active material, a conductive material and a binder to a cathode current collector, followed by drying and pressing. The mixture may further contain a filler, if necessary.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium or silver. If necessary, these current collectors may be processed to form fine irregularities on the surface thereof so as to enhance adhesion to the cathode active materials. In addition, the current collectors may be used in various forms including films, sheets, foils, nets, porous structures, foams and non-woven fabrics.

Examples of the cathode current collector include, but are not limited to, layered compounds such as lithium cobalt oxide ($LiCoO_2$) and lithium nickel oxide ($LiNiO_2$) or these compounds substituted by one or more transition metals;

lithium manganese oxides represented by $Li_{1+x}Mn_{2-x}O_4$ (in which $0 \le x \le 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides represented by $LiNi_{1-x}M_xO_2$ (M=Co, Mn, Al, Cu, Fe, Mg, B or Ga, and $0.01 \le x \le 0.3$); lithium manganese composite oxides represented by $LiMn_{2-x}M_xO_2$ (M=Co, Ni, Fe, Cr, Zn or Ta, and $0.01 \le x \le 0.1$), or $Li_2Mn_3MO_8$ (M=Fe, Co, Ni, Cu or Zn); $LiMn_2O_4$ wherein a part of Li is substituted by an alkaline earth metal ion; disulfide compounds; and $Fe_2(MoO_4)_3$.

In a specific embodiment, corresponding to a high potential of the lithium titanium oxide, lithium manganese composite oxide with a spinel structure which is high-potential oxide may be used as a cathode active material and the lithium manganese composite oxide may be represented by the following Formula 2:

$$Li_xM'_yMn_{2-y}O_{4-z}A_z \qquad (2)$$

wherein $0.9 \le x \le 1.2$, $0 < y < 2$, and $0 \le z < 0.2$;

M' is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or bivalent anion.

Specifically, the lithium manganese composite oxide may be lithium nickel manganese oxide represented by the following Formula 3 and more specifically, may be $LiNi_{0.5}Mn_{1.5}O_4$ or $LiNi_{0.4}Mn_{1.6}O_4$.

$$Li_xNi_yMn_{2-y}O_4 \qquad (3)$$

wherein $0.9 \le x \le 1.2$, and $0.4 \le y \le 0.5$.

The conductive material is commonly added in an amount of 1 to 50% by weight, based on the total weight of the mixture comprising the cathode active material. Any conductive material may be used without particular limitation so long as it has suitable conductivity without causing adverse chemical changes in the battery. Examples of conductive materials include: graphite such as natural graphite or artificial graphite; carbon black such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The binder is a component enhancing binding of an electrode active material to the conductive material and the current collector. The binder is commonly added in an amount of 1 to 50% by weight, based on the total weight of the mixture comprising the cathode active material. Examples of the binder include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Meanwhile, the anode is prepared by applying an anode active material to an anode current collector, followed by drying and pressing. The anode active material may comprise the afore-mentioned components, i.e., a conductive material, a binder and a filler, if necessary.

The anode current collector is generally fabricated to have a thickness of 3 to 500 µm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, the anode current collector may be processed to form fine irregularities on the surface thereof so as to enhance adhesion to the anode active materials. In addition, the current collectors may be used in various forms including films, sheets, foils, nets, porous structures, foams and non-woven fabrics.

In addition to the lithium titanium oxide (LTO), the anode active material such as carbon such as non-graphitized carbon and graphitized carbon; metal composite oxides such as $Li_xFe_2O_3$ ($0 \le x \le 1$), $Li_xWO_2$ ($0 \le x \le 1$) and $Sn_xMe_{1-x}Me'_yO_z$ (Me: Mn, Fe, Pb, Ge; Me': Al, B, P, Si, Group I, II and III elements of the Periodic Table, halogen atoms; $0 \le x \le 1$; $1 \le y \le 3$; and $1 \le z \le 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni based materials; and titanium oxide may be further used, but the present invention is not limited thereto.

The secondary battery may be a lithium secondary battery in which a lithium salt-containing electrolyte is impregnated into an electrode assembly.

The separator is interposed between the cathode and the anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and the electrolyte.

The lithium salt-containing, non-aqueous electrolyte is composed of an electrolyte and a lithium salt. Examples of the electrolyte include, but are not limited to a non-aqueous organic solvent, an organic solid electrolyte or an inorganic solid electrolyte.

Examples of the non-aqueous organic solvent include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate and ethyl propionate.

Examples of the organic solid electrolyte include polyethylene derivatives, polyethylene oxide derivatives, polypropylene oxide derivatives, phosphoric acid ester polymers, poly-agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sulfone (PRS) and the like.

In a preferred embodiment, the lithium salt-containing non-aqueous electrolyte can be prepared by adding a lithium salt such as $LiPF_6$, $LiClO_4$, $LiBF_4$, $LiN(SO_2CF_3)_2$, to a mixed solvent of cyclic carbonate such as EC or PC as a highly dielectric solvent and linear carbonate such as DEC, DMC or EMC as a low-viscosity solvent.

The present invention provides a battery module comprising the secondary battery as a unit battery and a battery pack comprising the battery module.

The battery pack may be used as a power source of a device requiring high-temperature stability, long cycle properties and high rate properties.

Preferably, examples of the device include, but are not limited to, power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes) and electric scooters (E-scooters); electric golf carts; power storage systems and the like.

Effects of the Invention

As apparent from the foregoing, the method for producing a secondary battery advantageously comprises storing the secondary battery at a SOC of 1 to 20 during activation, thereby reducing an amount of hydrogen gas generated during charge/discharge without causing any negative reactions, securing safety of the secondary battery and improving electrochemical performance.

BRIEF DESCRIPTION OF THE DRAWINGS

The above and other objects, features and other advantages of the present invention will be more clearly understood from the following detailed description taken in conjunction with the accompanying drawings, in which.

BEST MODE

Figure 1:
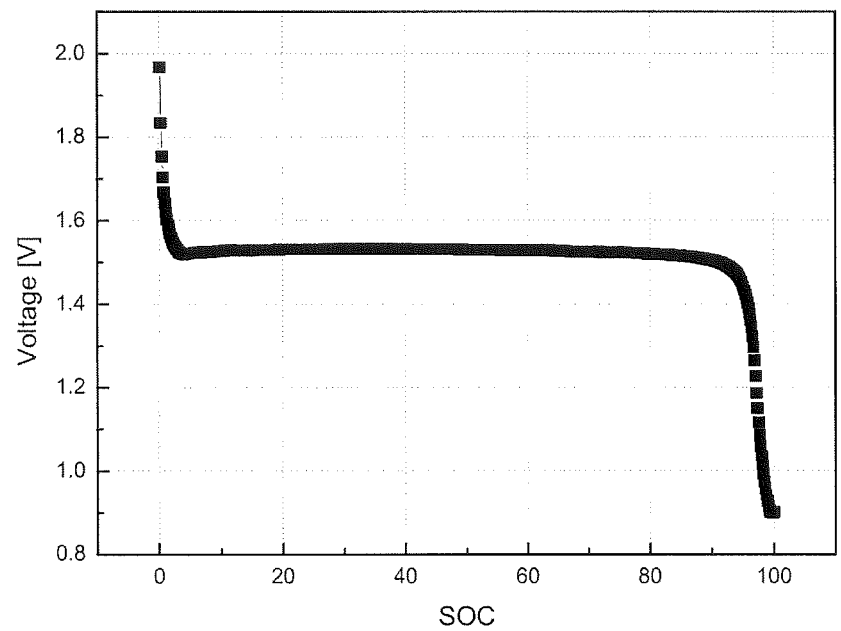
FIG. 1 is a graph showing a charge of state (SOC) of a lithium titanium oxide anode.

Now, the present invention will be described in more detail with reference to the following examples. These examples are provided only to illustrate the present invention and should not be construed as limiting the scope and spirit of the present invention.

EXAMPLE 1

90% by weight of $LiNi_{0.5}Mn_{1.5}O_4$ as a cathode active material, 5% by weight of Super-P (conductive material), and 5% by weight of PVdF (binder) were added to N-methyl-2-pyrrolidone (NMP) as a solvent to prepare a slurry, and the slurry was coated on an aluminum foil with a thickness of 20 μm, followed by drying and pressing, to produce a cathode.

Titanium isopropoxide was mixed with lithium hydroxide, followed by baking at a high temperature to prepare $Li_{4/3}Ti_{5/3}O_4$, and 83% by weight of the prepared anode active material, 12% by weight of Super-P (conductive material) and 5% by weight of PVdF (binder) were added to NMP, to prepare an anode mixture slurry. The slurry was coated on an Al-foil with a thickness of 20 on, followed by drying and pressing, to produce an anode.

The cathode and the anode were laminated using Celgard™ as a separator to produce a battery assembly, and a lithium non-aqueous electrolyte containing ethyl carbonate and ethyl propionate at a volume ratio of 1:9 and further containing 1M $LiPF_6$ as a lithium salt was added to the battery assembly to produce a lithium secondary battery. The produced secondary battery was stored at a temperature of 60° C. and at a SOC of 1 for 24 hours and gas was removed to complete a lithium secondary battery with a capacity of 550 mAh.

EXAMPLE 2

A lithium secondary battery was produced in the same manner as in Example 1, except that the lithium secondary battery was stored at a temperature of 60° C. and at a SOC of 10 for 24 hours and gas was then removed in the process of producing the lithium secondary battery.

COMPARATIVE EXAMPLE 1

A lithium secondary battery was produced in the same manner as in Example 1, except that the lithium secondary battery was stored at a temperature of 60° C. and at a SOC of 40 for 24 hours and gas was then removed in the process of producing the lithium secondary battery.

COMPARATIVE EXAMPLE 2

A lithium secondary battery was produced in the same manner as in Example 1, except that the lithium secondary battery was stored at a temperature of 60° C. and at a SOC of 70 for 24 hours and gas was then removed in the process of producing the lithium secondary battery.

COMPARATIVE EXAMPLE 3

A lithium secondary battery was produced in the same manner as in Example 1, except that the lithium secondary battery was stored at a temperature of 60° C. and at a SOC of 100 for 24 hours and gas was then removed in the process of producing the lithium secondary battery.

EXPERIMENTAL EXAMPLE 1

Lifespan properties of the batteries produced in Examples 1 to 2 and Comparative Examples 1 to 3 were tested at a voltage of 4.4 to 5V and a current of 0.5C-rate and a maintenance (%) of a $1^{st}$ cycle capacity to a $50^{th}$ cycle capacity was measured. Results are shown in Table 1 and FIG. 2.

TABLE 1

|  | $1^{st}$ capacity | Maintenance |
|---|---|---|
| Ex. 1 | 550 mAh | 85% |
| Ex. 2 | 550 mAh | 83% |
| Comp. Ex. 1 | 460 mAh | 79% |
| Comp. Ex. 2 | 460 mAh | 78% |
| Comp. Ex. 3 | 460 mAh | 77% |

Figure 2:
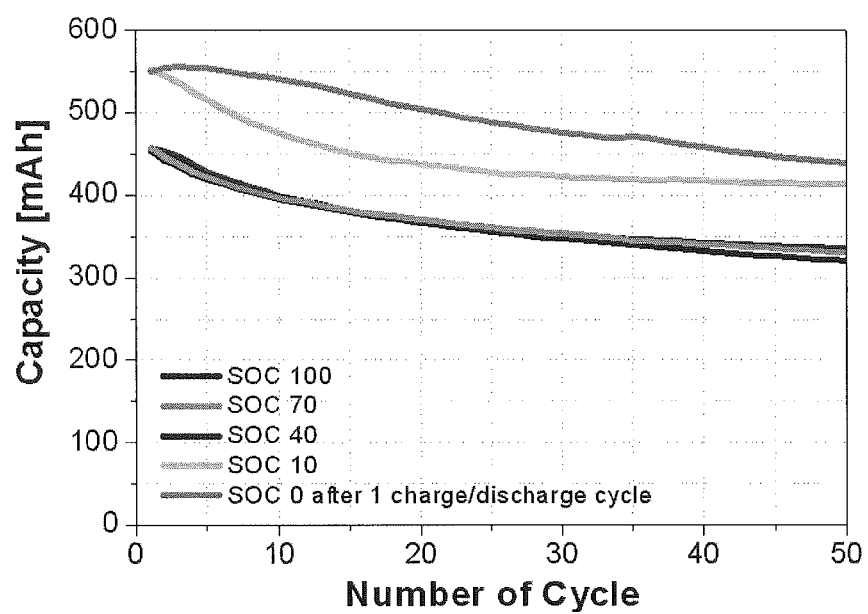
FIG. 2 is a graph showing lifespan of secondary batteries according to Example 1 to 2 and Comparative Examples 1 to 3.

As can be seen from Table 1 and FIG. 2, the batteries of Examples 1 and 2 produced by the method according to the present invention exhibited superior $1^{st}$ cycle capacity and high maintenance of $1^{st}$ cycle capacity to $50^{th}$ cycle capacity, as compared to the batteries of Comparative Examples 1 to 3.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for producing a secondary battery in which an electrode assembly comprising a cathode, an anode and a separator interposed between the cathode and the anode is accommodated in a battery case, the method comprising:
   inserting the electrode assembly into the battery case;
   injecting an electrolyte into the battery case accommodating the electrode assembly to obtain a secondary battery;
   storing the secondary battery at a SOC of 1 to 20% for 3 hours to 10 days;
   removing gas present in the secondary battery; and
   sealing the battery case,
   wherein the anode comprises lithium titanium oxide (LTO) represented by the following Formula 1 as an anode active material:

$$Li_aTi_bO_{4-c}A_c \quad (1)$$

wherein a, b and c are determined according to an oxidation number within ranges of $0.5 \leq a \leq 3$, $1 \leq b \leq 2.5$, and $0 \leq c < 0.2$; and
   A is at least one monovalent or bivalent anion.

2. The method according to claim 1, wherein the storing is carried out at 40° C. to 70° C.

3. The method according to claim 1, wherein the lithium titanium oxide of Formula 1 is $Li_{1.33}Ti_{1.67}O_4$ or $LiTi_2O_4$.

4. A secondary battery produced by the method according to claim 1.

5. The secondary battery according to claim 4, wherein the secondary battery is accommodated in a rectangular, cylindrical or pouch battery case.

6. The secondary battery according to claim 5, wherein the pouch battery case comprises a laminate sheet including a resin layer and a metal layer.

7. The secondary battery according to claim 6, wherein the laminate sheet has a laminate structure including an outer resin layer, an air and moisture-blocking metal layer, and a heat-fusing inner resin layer.

8. The secondary battery according to claim 4, wherein the secondary battery comprises lithium manganese composite oxide with a spinel structure represented by the following Formula 2 as a cathode active material:

$$Li_xM'_yMn_{2-y}O_{4-z}A_z \quad (2)$$

wherein $0.9 \leq x \leq 1.2$, $0 < y < 2$, and $0 \leq z < 0.2$;
   M' is at least one element selected from the group consisting of Al, Mg, Ni, Co, Fe, Cr, V, Ti, Cu, B, Ca, Zn, Zr, Nb, Mo, Sr, Sb, W, Ti and Bi; and
   A is at least one monovalent or bivalent anion.

9. The secondary battery according to claim 8, wherein the lithium manganese composite oxide of Formula 2 is lithium nickel manganese oxide represented by the following Formula 3:

$$Li_xNi_yMn_{2-y}O_4 \quad (3)$$

wherein $0.9 \leq x \leq 1.2$, and $0.4 \leq y \leq 0.5$.

10. The secondary battery according to claim 9, wherein the lithium nickel manganese oxide of Formula 3 is $LiNi_{0.5}Mn_{1.5}O_4$ or $LiNi_{0.4}Mn_{1.6}O_4$.

11. The secondary battery according to claim 10, wherein the secondary battery is a lithium secondary battery.

12. A battery module comprising the secondary battery according to claim 4 as a unit battery.

13. A battery pack comprising the battery module according to claim 12.

14. A device comprising the battery pack according to claim 13.

15. The device according to claim 14, wherein the device is an electric vehicle, a hybrid electric vehicle, a plug-in hybrid electric vehicle or a power storage system.

* * * * *